United States Patent Office 3,073,845
Patented Jan. 15, 1963

3,073,845

SUBSTITUTED 3,6-DIHYDRO-2H-1-THIAPYRANS AND THE PROCESS FOR PRODUCING THEM

William J. Middleton, Claymont, Del., assignor to E. I. du Pont de Nemours and Company, Wilmington, Del., a corporation of Delaware No Drawing. Filed Dec. 18, 1959, Ser. No. 860,348
21 Claims. (Cl. 260—327)

This invention relates to, and has as its principal objects provision of, novel heterocyclic organic compounds containing both sulfur and fluorine and a method for the preparation of the same.

A few dihydro-2H-1-thiapyrans are known; however, none of these contains a fluorine-containing substituent. Because of the unusual properties imparted to organic compounds by fluorine substituents, it is a desirable goal to provide a new class of compounds having the dihydro-2H-1-thiapyran ring structure and also having at least one fluorine-containing substituent.

A new class of dihydro-2H-1-thiapyrans is provided by this invention. These novel compounds are 3,6-dihydro-2H-1-thiapyrans having a fluorine or a fluorine-containing substituent in the 2-position. More specifically, the products of this invention have the following general formula:

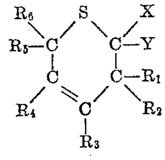

wherein X is fluorine, $R_p$, $SR_p$, or the $SR_p$ can be joined with an $R_p$ of group Y, and wherein $R_p$ is an α-fluoroalkyl having up to 7 carbon atoms; Y is X, chlorine, R, or SR, wherein R is an alkyl or an aryl having up to 7 carbon atoms; $R_1$ and $R_2$ are the same or different and can be hydrogen, a monovalent hydrocarbon radical of up to 8 carbon atoms, or one of $R_1$ and $R_2$ taken with one of $R_5$ and $R_6$ can be a divalent hydrocarbon radical having 1–10 carbon atoms; $R_5$ and $R_6$ are the same or different and can be hydrogen or a monovalent hydrocarbon radical of up to 8 carbon atoms; and $R_3$ and $R_4$ are the same or different and can be hydrogen, fluorine, chlorine, monovalent hydrocarbon radical of up to 8 carbon atoms, and $R_3$ and $R_4$ taken together can be a divalent hydrocarbon radical having up to 10 carbon atoms.

The compounds of this invention have been named in accordance with recent Chemical Abstracts indexing practice in which the parent 2H-1-thiapyran is:

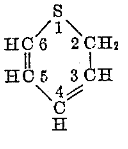

In this name, the 2H-1 indicates that the carbon in the 2-position of the ring is saturated and that the sulfur is in the 1-position. In the 3,6-dihydro-2H-1-thiapyrans of this invention, the numerals 3 and 6 refer to the positions of the other two saturated carbon atoms. The carbons in the 2, 3, and 6-positions may have one or both of their hydrogen atoms replaced by other elements or radicals as defined above.

The fluorine-containing 3,6-hihydro-2H-1-thiapyrans of this invention are prepared simply by contacting a conjugated diene of the formula

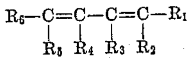

with a fluorine-containing thiocarbonyl compound of the formula

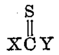

wherein the symbols have the meanings defined hereinbefore. The reaction is a direct cyclo-addition reaction between 1 mole of the fluorothiocarbonyl compound and 1 mole of the 1,3-diene. The sulfur of the thiocarbonyl group of the fluorothiocarbonyl compound becomes the ring sulfur of the thiapyran ring and the carbon of the thiocarbonyl group becomes the saturated carbon in the 2-position of the thiapyran ring. The remaining carbons in this ring are furnished by the 1,3-diene, i.e., the four chain carbons of the conjugated 1,3-diene. This cyclo-addition takes place by the well-known Diels-Alder reaction. Thus, in this reaction the two carbon-carbon double bonds in the 1- and 3-positions of the diene break and a valence bond from each of the 1- and 4-carbons adds across and with the double bond of the thiocarbonyl group to form the 2H-1-thiapyran ring and the remaining two valence bonds from the broken carbon-carbon double bonds in the 1,3-diene structure move inwardly toward each other to form the carbon-carbon double bond between the 2- and 3-carbons of the diene residue. Consequently, the sulfur-containing 6-membered ring that is formed contains one carbon-carbon double bond between the 4- and 5-carbons of that ring. This reaction is illustrated by the following equation in which the symbols X, Y, $R_1$, $R_2$, $R_3$, $R_4$, $R_5$, and $R_6$ have the meanings defined previously:

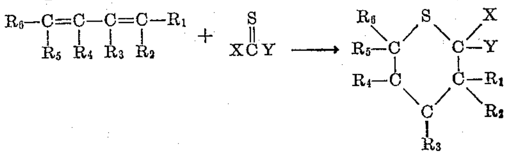

The process of this invention is a simple one and requires no complicated operating procedure or equipment. It is conveniently carried out in a closed reaction vessel constructed of an inert material capable of withstanding the reactants and operating conditions, for example, in a glass or glass-lined reactor. Since many of the reactants are low boiling and since many are quite reactive with the co-reactant being employed, the reaction is generally carried out by cooling the reaction vessel to a low temperature, e.g., the temperature of liquid nitrogen (about −196° C.) or of a mixture of solid carbon dioxide and acetone (about −80° C.), then charging this reaction vessel with the 1,3-diene and adding the fluorine-containing thiocarbonyl compound, closing the reaction vessel and allowing the reaction to proceed until the color of the thiocarbonyl compound has disappeared. Generally, an exothermic reaction takes place and the reaction vessel can be cooled externally to control the rate of reaction. The reaction vessel and its contents are then warmed slowly to room temperature (20–30° C.). With higher boiling reactants, a closed reaction system is not necessary and in this case the reaction can be conveniently carried out at atmospheric pressure under reflux. In those cases where the heat of reaction is not sufficient to carry the reaction to completion, the reaction mixture can be heated externally, e.g., to a temperature of up to 100–150° C. if desired.

Reaction times ranging from a few minutes, e.g., 5–10 minutes, up to several hours, e.g., 20–30 hours, depending on the reactivity of the specific co-reactants and the particular operating temperature being employed. For example, hexafluorothioacetone reacts quantitatively with 1,3-butadiene in less than 1 minute at −80° C., while 20 hours or more are required for reaction of pentafluorothiopropionyl fluoride with anthracene at room temperature.

It is not necessary to employ a reaction medium in the process of this invention, but an inert organic liquid can be used if desired. If a reaction medium is used, it is preferred that it be anhydrous since many of the thiocarbonyl compounds react rapidly with water. Any inert liquid organic diluent can be used. Examples of suitable diluents which can be used as reaction media include hydrocarbons such as benzene, pentane, octane, cyclohexane, etc.; carbon bisulfide; polyfluorinated hydrocarbons such as perfluorodimethylcyclohexane; and the like.

The 3,6-dihydro-2H-1-thiapyrans are isolated from the reaction mixture by various means depending on the physical properties of the particular products. Normally liquid products are conveniently isolated from the reaction mixture by fractional distillation. Normally solid reaction products are conveniently isolated by crystallization, followed by recrystallization from a solvent such as pentane. Discolored solid products can be purified by treatment with activated carbon followed by recrystallization from a suitable solvent.

The products and processes of this invention are illustrated in further detail by the following examples.

EXAMPLE I

Butadiene, 10.8 g. (17.4 ml., 0.2 mole), is condensed into a calibrated receiver cooled to −78° C. Hexafluorothioacetone is then distilled into the receiver until a faint blue color persists. The reaction mixture is allowed to warm to room temperature (25° C.) and is then distilled. There is obtained 42.4 g., 90% of theory, of a colorless oil boiling at 65° C./30 mm., refractive index, $n_D^{25}$, of 1.4048.

*Analysis.*—Calc'd for $C_7H_6F_6S$: C, 35.60%; H, 2.60%; F, 48.20%; S, 13.50%. Found: C, 36.32%; H, 2.67%; F, 46.92%; S, 13.87%.

The infrared absorption spectrum contains bands at 325 microns (=CH), 3.4 and 3.5 microns (saturated $CH_2$) and 5.95 microns (—CH=CH—). The nuclear magnetic resonance fluorine spectrum contains a single sharp peak and the proton spectrum contains three peaks in equal ratio.

These analytical data are in accord with a compound of the following formula:

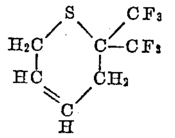

This compound is 2,2-bis-trifluoromethyl-3,6-dihydro-2H-1-thiapyran.

EXAMPLE II 2,3-dimethylbutadiene, 8.2 g. (0.1 mole), is placed in a receiver and cooled to −78° C. Hexafluorothioacetone, 12 g. (0.066 mole), is distilled into the receiver. The blue color of the hexafluorothioacetone fades rapidly as the contents of the receiver are mixed. The reaction mixture is allowed to warm to room temperature (25° C.) and is then distilled. There is obtained 15.6 g. (90% of theory) of a colorless oil boiling at 52° C./3 mm. and having a refractive index, $n_D^{22.5}$, of 1.4197.

*Analysis.*—Calc'd for $C_9H_{10}F_6S$: C, 40.80%; H, 3.80%; F, 43.20%; S, 12.10%. Found: C, 41.99%; H, 3.97%; F, 42.28%; S, 12.41%.

The infrared absorption spectrum contains bands at 3.35, 3.4 and 3.5 microns ($CH_2$ and $CH_3$) and 5.95 microns (C=C). The fluorine nuclear magnetic resonance spectrum contains a single sharp peak, and the proton spectrum contains three peaks in the ratio of 1:1:3. These analytical data indicate that the product has the formula:

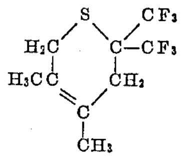

This compound is 2,2-bis-trifluoromethyl-3,6-dihydro-4,5-dimethyl-2H-1-thiapyran.

EXAMPLE III

Chloroprene (2-chloro-1,3-butadiene), 2.66 g. (0.03 mole), is placed in a receiver and cooled to −78° C. Hexafluorothioacetone is distilled into the receiver until a faint blue color persists (5.46 g. being required). The reaction mixture is distilled and there is obtained 6.1 g., 75% of theory, of a colorless oil boiling at 53° C./6 mm. and having a refractive index, $n_D^{23}$, of 1.4278.

*Analysis.*—Calc'd for $C_7H_5ClF_6S$: C, 31.10%; H, 1.90%; Cl, 13.10%; S, 11.80%. Found: C, 31.44%; H, 1.88%; Cl, 13.22%; S, 12.75%.

The nuclear magnetic resonance spectrum obtained indicates that the product is a mixture of the 4- and 5-chloroisomers in the ratio of about 2:1. These analytical data indicate that the products have the following formulas:

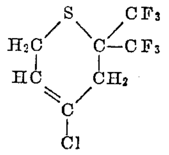

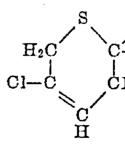

These compounds are 2,2-bis-trifluoromethyl-4-chloro-3,6-dihydro-2H-1-thiapyran and 2,2-bis-trifluoromethyl-5-chloro-3,6-dihydro-2H-1-thiapyran.

EXAMPLE IV

A reaction vessel is charged with 3.4 g. of cyclopentadiene (0.05 mole) and cooled to −78° C. Hexafluorothioacetone is then distilled into the vessel until a faint blue color persists, 4.1 g. being required. The reaction mixture is allowed to warm to room temperature and is then distilled. There is obtained 10.5 g., 85% of theory, of a colorless oil boiling at 54.5° C./8 mm. and having a refractive index, $n_D^{22.7}$, of 1.4235.

*Analysis.*—Calc'd for $C_8H_6F_6S$: F, 45.90%. Found: F, 45.87%.

These data indicate that the product has the following formula:

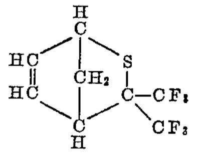

This compound is 3,3-bis-trifluoromethyl-2-thiabicyclo[2.2.1]hept-5-ene. This nomenclature for the product shows the fluorinated substituents ($CF_3$) in the 3-position; however, it is readily seen from the above formula that they are in the 2-position of the 2H-1-thiapyran ring which is part of the complete nucleus.

EXAMPLE V

A reaction vessel is charged with 0.25 g. (0.014 mole) of anthracene and 5 ml. of benzene and cooled to 10° C. To this suspension is added 0.237 g. (0.013 mole) of hexafluorothioacetone and the reaction mixture is stirred vigorously until the blue color fades. The solution is filtered and the filtrate is evacuated to dryness. The white crystalline residue that forms is recrystallized from pentane and there is obtained 0.40 g., 85% of theory, of long white needles melting at 123–124° C.

*Analysis.*—Calc'd for $C_{17}H_{10}F_6S$: C, 56.67%; H, 2.80%; F, 31.64%; S, 8.90%. Found: C, 56.95%; H, 3.00%; F, 31.60%; S, 8,82%.

These analytical data indicate that the product has the following formula:

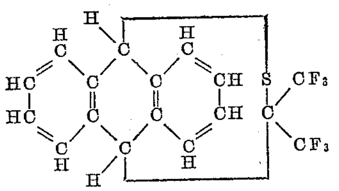

This compound is 12,12-bis-trifluoromethyl-9,10-dihydro-9,10-epithiomethanoanthracene.

A 1.0 g. sample of 12,12-bis-trifluoromethyl-9,10-dihydro-9,10-epithiomethanoanthracene in a glass test tube connected to a trap cooled by a mixture of solid carbon dioxide and acetone and evacuated to 300 mm. Hg pressure is heated with an open flame until it melts and begins to evolve gas vigorously. Cautious heating is continued until the copious evolution of gas ceases. There is obtained from the cold trap 0.2 ml. of a deep blue liquid which is identified by nuclear magnetic resonance analysis as hexafluorothioacetone.

EXAMPLE VI

A solution of 0.2 g. (0.0017 mole) of anthracene in 5 ml. of carbon disulfide is placed in a reaction vessel and there is then added 0.4 g. (0.0017 mole) of perfluorobutanethione. The blue color of the perfluorobutanethione fades rapidly and a sticky glass is obtained. This residue becomes crystalline after standing for several days at ambient temperature. The solid is recrystallized twice from pentane and there is obtained a white crystalline powder melting at 54–55° C.

*Analysis.*—Calc'd for $C_{18}H_{10}F_8S$: C, 52.66%; H, 2.46%; F, 37.04%; S, 7.81%. Found: C, 53.16%; H, 3.08%; F, 36.85%; S, 7.69%.

The analytical data indicate that the compound has the following formula:

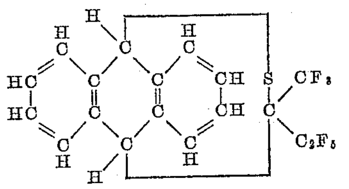

This compound is 12-trifluoromethyl-12-pentafluoroethyl-9,10-dihydro-9,10-epithiomethanoanthracene.

EXAMPLE VII

A mixture of 21.6 g. (0.82 mole) of anthracene, 16 g. of trifluorothioacetyl fluoride (0.82 mole) and 50 ml. of benzene is sealed in a thick-walled glass tube and allowed to remain at room temperature overnight. The tube is cooled to −80° C. and is then opened. The liquid material is poured out and the solid remaining in the tube is dissolved in 50 ml. of warm carbon disulfide. The carbon disulfide solution is then combined with the liquid from the tube. The resulting solution is treated with decolorizing carbon and then filtered and the filtrate is evaporated to dryness. The solid residue is recrystallized twice from pentane solution (treated with decolorizing carbon). There is obtained 27.2 g. of a cream-colored, granular solid melting at 85° C.

*Analysis.*—Calcd for $C_{16}H_{10}F_4S$: C, 62.93%; H, 3.25%; F, 24.49%; S, 10.33%. Found: C, 62.69%; H, 3.62%; F, 23.91%; S, 10.03%.

These analytical data indicate that the compound has the following formula:

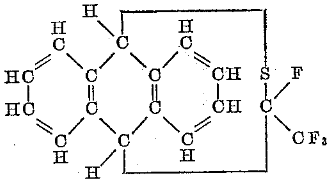

This compound is 12-fluoro-12-trifluoromethyl-9,10-dihydro-9,10-epithiomethanoanthracene.

EXAMPLE VIII

A reaction vessel containing 8.2 g. (0.01 mole) of 2,3-dimethyl-1,3-butadiene is cooled to −78° C. and trifluorothioacetyl fluoride is distilled into the diene until a faint yellow color remains, 13.2 g. being required. The reaction mixture is allowed to warm to room temperature and is then distilled. There is obtained 14.3 g., 67% of theory, of a colorless liquid boiling at 45° C./2 mm. having a refractive index, $n_D^{24}$, of 1.4347.

*Analysis.*—Calc'd for $C_8H_{12}F_4S$: C, 44.80%; H, 4.72%; F, 35.50%; S, 14.90%. Found: C, 45.11%; H, 5.10%; F, 35.21%; S, 14.12%.

These analytical data indicate that the compound has the following formula:

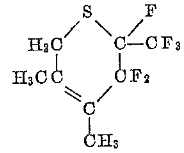

This compound is 2-fluoro-2-trifluoromethyl-3,6-dihydro-4,5-dimethyl-2H-1-thiapyran.

EXAMPLE IX

A reaction vessel is charged with 6.6 g. (0.1 mole) of freshly distilled cyclopentadiene and is cooled to −78° C. Trifluorothioacetyl fluoride is distilled into the reaction vessel until a faint yellow color persists in the reaction mixture, 13.2 g. being required. The reaction mixture is allowed to warm to room temperature and is then distilled. There is obtained 2.7 g., 14% of theory, of a colorless liquid boiling at 45° C./7 mm. and having a refractive index, $n_D^{24}$, of 1.4396, and 16 g. of a clear glassy polymeric residue.

*Analysis.*—Calc'd. for $C_7H_6F_6S$: C, 42.42%; H, 3.05%; F, 38.36%; S, 16.17%. Found: C, 42.30%; H, 3.25%; F, 38.08%; S, 16.41%.

The fluorine nuclear magnetic resonance analysis of the liquid indicates it to be a mixture of isomers in the ratio of about 2:7. These analytical data indicate that the monomeric products have the formulas:

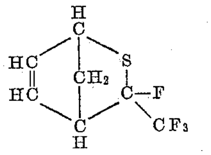 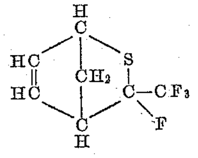

These monomeric compounds are the geometric isomers of 3-fluoro - 3 - trifluoromethyl-2-thiabicyclo[2.2.1]hept-5-ene. The solid product is a polymer of these monomeric isomers.

EXAMPLE X

A cold reaction vessel is charged with 8.7 ml. (5.4 g., 0.1 mole) of 1,3-butadiene and is then cooled to −78° C. Trifluorothioacetyl fluoride is distilled into the reaction vessel until a faint yellow color persists, 13.2 g. being required. The vessel is then closed and the reaction mixture is allowed to warm to room temperature. On distillation there is obtained 10.3 g., 56% of theory, of a colorless liquid boiling at 39° C./10 mm. and having a refractive index, $n_D^{24}$, of 1.4213. The nuclear magnetic resonance spectrum of this product indicates that it has the following formula:

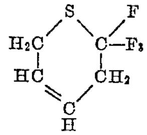

This compound is 2-fluoro-2-trifluoromethyl-3,6-dihydro-2H-1-thiapyran.

A sample of the product of Example X stored at room temperature for one week etches its glass container badly. The material from this container is redistilled and elemental and nuclear magnetic resonance analysis of the redistilled product indicate that it has lost hydrogen fluoride.

*Analysis.*—Calc'd. for $C_6H_5F_3S$: C, 43.40%; H, 3.00%; F, 34.30%; S, 19.30%. Found: C, 43.60%; H, 3.55%; F, 34.10%; S, 19.55%.

The infrared absorption spectrum showing bands at 6.1 microns and 6.35 microns is consistent with the assignment of the structure of this compound as 6-trifluoromethyl-2H-1-thiapyran.

EXAMPLE XI

Thiocarbonyl fluoride, 10 ml. (14 g., 0.017 mole) is slowly distilled into a reaction vessel containing 14 ml. (11.2 g., 0.17 mole) of freshly distilled cyclopentadiene cooled to —78° C. During the addition of the thiocarbonyl fluoride, the reaction mixture is stirred and kept below —20° C. with a cooling bath. When the addition is complete, 30 minutes being required, the reaction mixture is allowed to warm to room temperature and is then evacuated to 1 mm. mercury pressure by means of an oil pump. During the evacuation the reaction mixture solidifies to a white granular solid. There is obtained 25 g. of the white solid, M.P. 47.5–48.5° C. A small sample is sublimed for analysis.

*Analysis.*—Calc'd for $C_6H_6F_2S$: C, 48.64%; H, 4.10%; F, 25.60%; S, 21.60%. Found: C, 48.37%; H, 4.19%; F, 25.07%; S, 21.36%.

The fluorine nuclear magnetic resonance spectrum shows the WSSW pattern with one side split into doublets. The infrared absorption spectrum having bands at 3.25, 3.35, 3.4 and 6.55; microns is consistent with the structure proposed below. These data indicate that the compound has the formula:

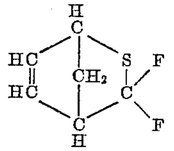

This compound is 3,3-difluoro-2-thiabicyclo[2.2.1]hept-5-ene.

When the product of Example XI is stored at room temperature for several days, or heated above its melting point for a few minutes, it polymerizes to a white rubbery polymer.

A stable derivative is made by adding bromine to the product of Example XI. Bromine is added dropwise to a solution of 1.48 g. (0.01 mole) of this product in 2 ml. of carbon tetrachloride until a slight bromine color remains. The reaction mixture is cooled in a bath of acetone and solid carbon dioxide and the solid that precipitates is collected on a filter and recyrstallized from pentane. There is obtained 1.89 g. of 4,6-dibromo-3,3-difluoro-2-thiabicyclo[2.2.1]heptane.

*Analysis.*—Calc'd for $C_6H_6Br_2F_2S$: C, 23.40%; H, 2.00%; Br, 51.90%; F. 12.30%; S, 10.40%. Found: C, 23.91%; H, 2.19%; Br, 52.26%; F, 11.60%; S, 10.20%.

EXAMPLE XII 2,3-dimethyl-1,3-butadiene, 1 g. (0.012 mole), is added dropwise to 2.26 g. (0.01 mole) of perfluorodithiobutyrolactone cooled to 0° C. by means of an ice bath. When the initial exothermic reaction has subsided and the red color has faded to yellow (about 5 minutes being required for this reaction), the reaction mixture is distilled. There is obtained 2.16 g., 70% of theory, of a light yellow oil boiling at 67–68° C./0.75 mm. and having a refractive index, $n_D^{24}$, of 1.4677.

*Analysis.*—Calc'd for $C_{10}H_{10}F_6S_2$: C, 39.00%; H, 3.00%; F, 37.00%; S, 20.70%. Found: C, 39.40%; H, 3.93%; F, 36.89%; S, 21.02%.

These analytical data indicate that the product has the following formula:

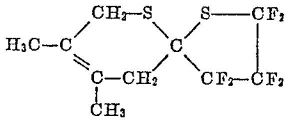

This compound is 2,3,4-hexafluoro-8,9-dimethyl-1,6-dithiaspiro[4.5]dec-8-ene.

EXAMPLE XIII

A reaction vessel is charged with 1.36 g. (0.00513 mole) of bis-trifluoromethyl-trithiocarbonate and cyclopentadiene is added dropwise until the red color of the trithiocarbonate is discharged. Approximately 1 minute is required for the addition of 0.34 g. of cyclopentadiene. The reaction product is distilled and there is obtained 1.1 g., 70% of theory, of a light yellow oil boiling at 63° C./1.3 mm. and having a refractive index, $n_D^{23.5}$, of 1.4893.

*Analysis.*—Calc'd for $C_8H_6F_6S_3$: S, 30.80%. Found: S, 30.32%.

These analytical data indicate that the product has the following formula:

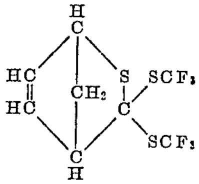

This compound is 3,3-bis-trifluoromethylthio-2-thiabicyclo[2.2.1]hept-5-ene.

EXAMPLES XIV, XV, AND XVI

Cyclopentadiene is added dropwise to small portions of trifluorothioacetyl chloride, ethyl chlorodifluorodithioacetate and trifluoromethyl chlorodithioformate at 25° C. until the red color of each of these thiocarbonyl compounds fades. The nuclear magnetic resonance analysis of each of these reaction mixtures indicate that the following products are formed:

Example No. XIV

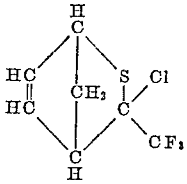

3-chloro-3-trifluoromethyl-2-thiabicyclo[2.2.1]hept-5-ene

Example No. XV

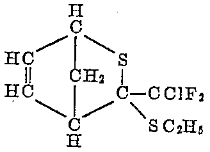

3-chlorodifluoromethyl-3-ethylthio-2-thiabicyclo[2.2.1]hept-5-ene

Example No. XVI

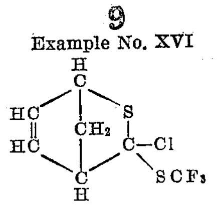

3-chloro-3-trifluoromethylthio-2-thiabicyclo[2.2.1]hept-5-ene

EXAMPLE XVII

A mixture of 0.91 g. (0.005 mole) of pentafluorothiopropionyl fluoride, 0.89 g. (0.005 mole) of anthracene and 10 ml. of carbon disulfide is sealed in a glass tube and allowed to stand at room temperature for 20 hours. The tube is opened and the reaction solution is evaporated to dryness. The residue is recrystallized twice from pentane. There is obtained 1.1 g. of colorless prisms melting at 113–114° C.

*Analysis.*—Calc'd for $C_{17}H_{10}F_6S$: C, 56.67%; H, 2.80%; F, 31.64%; S, 8.90%. Found: C, 56.70%; H, 3.16%; F, 31.55%; S, 8.90%.

These analytical data indicate that the product has the following formula:

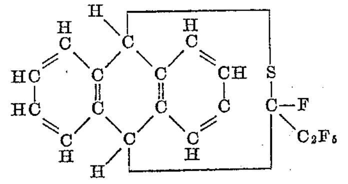

This compound is 12-fluoro-12-pentafluoroethyl-9,10-dihydro-9,10-epithiomethanoanthracene.

EXAMPLE XVIII

A mixture of 4.5 g. (0.055 mole) of 2,3-dimethyl-1,3-butadiene and 5.22 g. (0.03 mole) of ethyl trifluorodithioacetate is stirred at 0° C. for 7 hours and is then allowed to warm to room temperature and stand overnight. The reaction mixture is distilled and there is obtained 6.9 g. of a colorless oil boiling at 72° C/0.8 mm. and having a refractive index, $n_D^{23}$, of 1.4940.

*Analysis.*—Calc'd for $C_{10}H_{15}F_3S_2$: C, 46.85%; H, 5.90%; F, 22.24%; S, 25.01%. Found: C, 47.16%; H, 6.24%; F, 22.28%; S, 25.23%.

These analytical data indicate that the product has the following formula:

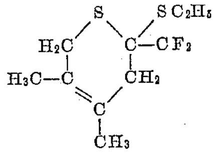

This compound is 2-trifluoromethyl-2-ethylthio-3,6-dihydro-4,5-dimethyl-2H-1-thiapyran.

EXAMPLE XIX

A reaction vessel containing 7.5 ml. of cyclopentadiene is maintained at −80° C. while 5.0 g. of trifluoromethyl dithiofluoroformate is added dropwise. The yellow color of the dithiofluoroformate is still present after 1 hour. The reaction mixture is allowed to warm slightly whereupon the color disappears rapidly and a water-white solution results. The product is stable at −80° C. but quickly darkens at room temperature. Fluorine nuclear magnetic resonance analysis indicates that the product is a mixture of the two geometric isomers (in the ratio of 15:85) of the following formulas:

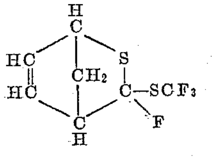

and

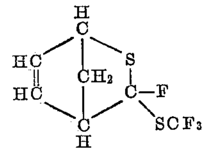

These compounds are 3-fluoro-3-trifluoromethylthio-2-thiabicyclo[2.2.1]hept-5-enes.

EXAMPLE XX

A purple mixture of trifluorothioacetone and trifluoroacetone (obtained on distillation of reaction mixtures containing 1,1,1-trifluoro-2-hydroxy-2-mercaptopropane at atmospheric pressure) is mixed with 2,3-dimethyl-1,3-butadiene at slightly above −80° C. whereupon the purple color is rapidly discharged. Distillation of the colorless reaction mixture affords a colorless oil boiling at 99° C./34 mm. and having a refractive index, $n_D^{25}$, of 1.4533.

*Analysis.*—Calc'd for $C_9H_{13}F_3S$: C, 51.49%; H, 6.23%; F, 27.10%; S, 15.25%. Found: C, 51.14%; H, 6.53%; F, 27.00%; S, 15.75%.

These analytical data and the nuclear magnetic resonance spectrum obtained on the product indicate that the product has the following formula:

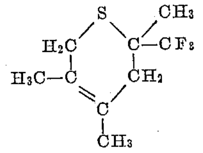

This compound is 2-trifluoromethyl-3,6-dihydro-2,4,5-trimethyl-2H-1-thiapyran.

EXAMPLE XXI

A reaction vessel containing the 1,1,2,2-tetrafluoro-3-pentanethione obtained by pyrolysis of 3.8 g. of 1,1,2,2-tetrafluoro-3,3-dimercaptopentane at 550° C. under a pressure of 1 mm. Hg or less and 3.0 ml. of 2,3-dimethyl-1,3-butadiene at −196° C. under vacuum is warmed to −80° C. and the reactants are mixed by shaking the vessel. On warming the reaction mixture slightly above −80° C., the magenta color of the fluorothioketone is discharged as rapid reaction occurs. Distillation of the reaction mixture affords the 1:1 adduct as a colorless oil, B.P. 107.5–108.5° C./8 mm.; $n_D^{26}$, 1.4612.

*Analysis.* — Calc'd. for $C_{11}H_{16}F_4S$: F, 29.61%; S, 12.51%. Found: F, 29.79%; S, 13.21%.

This compound is 2-ethyl-2-(1,1,2,2-tetrafluoroethyl)-3,6-dihydro-4,5-dimethyl-2H-1-dithiapyran having the following formula:

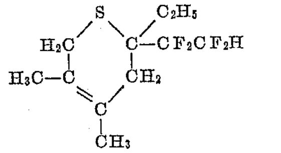

EXAMPLE XXII

A reaction vessel containing the trifluorothio-acetophenone obtained by pyrolysis of 3.3 g. of 1,1-dimercapto-2,2,2-trifluorophenylethane at 550° C. under a pressure of less than 1 mm. Hg and 6 ml. of 2,3-dimethyl-1,3-butadiene at −80° C. is warmed slightly whereupon the reactants melt. On shaking the liquid reaction mixture, the materials react with discharge of the blue color of the fluorothioketone. Distillation of the reaction mixture gives a colorless oil, B.P. 96° C./0.5 mm.; $n_D 2^6$, 1.5242.

*Analysis.* — Calc'd. for $C_{14}H_{15}F_3S$: F, 20.90%; S, 11.78%. Found: F, 21.06%; S, 12.05%.

This compound is 2-trifluoromethyl-3,6-dihydro-4,5-dimethyl-2-phenyl-2H-1-thiapyran having the formula:

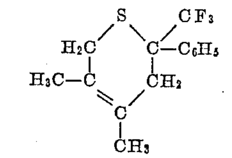

EXAMPLE XXIII

A reaction vessel is charged with 6.8 g. (0.1 mole) of furan and cooled to −78° C. whereupon hexafluorothioacetone is distilled into the reaction vessel until a faint blue color persists in the reaction mixture, 18.2 g. being required. The reaction product solidifies at this point. The product is sublimed at room temperature and 0.05 mm. mercury pressure into a trap cooled by solid carbon dioxide. There is obtained 18.2 g. of a white solid, M.P. 20–21° C., $n_D^{21.5}$, 1.4162.

*Analysis.* — Calc'd. for $C_7H_4F_6OS$: C, 33.60%; H, 1.60%; F, 45.60%; S, 12.80%. Found: C, 33.78%; H, 1.79%; F, 45.84%; S, 12.71.

These analytical data indicate that the product has the following formula:

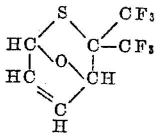

This compound is 2,2-bis-trifluoromethyl-3,6-epoxy-3,6-dihydro-2H-1-thiapyran.

Upon standing at room temperature, the product of Example XXIII slowly becomes more viscous. After 5 days the product is a hard glass. This is a polymer of 2,2-bis-trifluoromethyl-3,6-epoxy-3,6-dihydro-2H-1 - thiapyran.

*Analysis.*—Calc'd. for $(C_7H_4F_6OS)_x$: C, 33.60%; H, 1.60%; F, 45.60%; S, 12.80%. Found: C, 33.10%; H, 1.65%; F, 44.50%; S, 13.05%.

This polymer becomes sticky when warmed to 40° C. and is useful as an adhesive for joining sheets of paper together.

EXAMPLE XXIV

Two moles of hexafluorothioacetone reacts with one mole of styrene as indicated by the following equation:

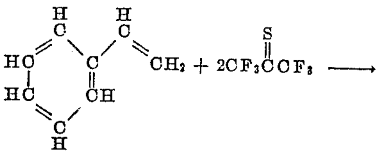

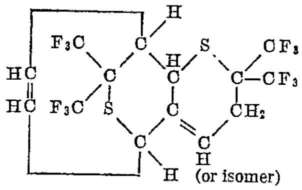

(or isomer)

Styrene is added dropwise to 1.9 g. (0.05 mole) of hexafluorothioacetone in a reaction vessel cooled to −78° C. until the blue color of the thioketone fades completely. The reaction product is then distilled and there is obtained 7.1 g. of a colorless, viscous oil, B.P. 103–104° C./1.2 mm. and having a refractive index, $n_D^{23.5}$, of 1.4518. The nuclear magnetic resonance hydrogen and fluorine spectra obtained on this product indicates that a mixture of isomers of the formula given above is present. Thus, these products are 3,7,8,8a-tetrahydro-2,2,7,7-tetrakis(trifluoromethyl)-5,8-etheno-2H, 5H - thiapyrano[4,3-b]thiapyran, and its isomers.

EXAMPLE XXV

As in Example XXIV, 1,1-diphenylethylene reacts with 2 moles of hexafluorothioacetone in accordance with the following equation:

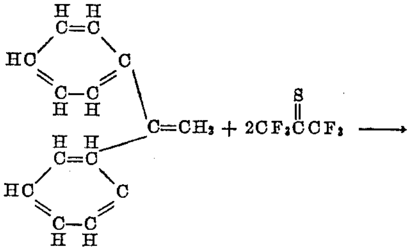

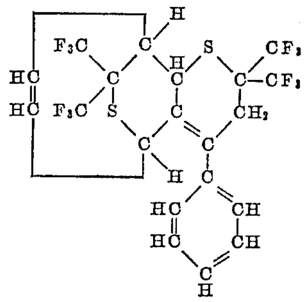

(or isomer)

A solution of 1.8 g. of 1,1-diphenylethylene in 10 ml. of pentane is added dropwise to 1.82 g. (0.01 mole) of hexafluorothioacetone in a reaction vessel cooled to −78° C. The blue color fades and a white solid precipitates during a period of 2–3 minutes. The solid is collected on a filter, washed with cold pentane and recrystallized from cyclohexane. There is obtained 2.5 g. of colorless crystals, M.P. 152–153° C.

*Analysis.*—Calc'd for $C_{20}H_{12}F_6S$: C, 44.12%; H, 2.23%; F, 41.88%; S, 11.78%. Found: C, 44.40%; H, 2.68%; F, 41.65%; S, 11.84%.

The nuclear magnetic resonance and infrared absorption spectra obtained on this product indicate that the compound has the structure shown above. This compound is 3,7,8,8a-tetrahydro - 2,2,7,7 - tetrakis(trifluoromethyl)-5,8-etheno-4 - phenyl - 2H,5H - thiapyrano[4,3-b]thiapyran.

EXAMPLE XXVI

Approximately equimolar amounts of anthracene and the orange-red fluorothioformyl cyanide (prepared by reaction of fluorochloroacetonitrile with sulfur at 600–650° C.) are mixed in a reaction vessel at −80° C. The reaction mixture is then allowed to warm gradually to room temperature during which time the decolorization of the fluorothioformyl cyanide is complete. Evaporation of the solution to dryness followed by two recrystallizations of the residue from benzene gives colorless crystals of pure 12-cyano-12-fluoro-9,10-dihydro-9,10-epithiomethanoanthracene, M.P. 139–142° C.

*Analysis.*—Calc'd for $C_{16}H_{10}FNS$: C, 71.90%; H, 3.77%; F, 7.11%; N, 5.24%; S, 11.99%. Found: C, 71.45%; H, 3.75%; F, 6.77%; N, 5.57%; S, 12.30%.

These analytical data and the infrared absorption spectrum obtained on the product are in agreement with the compound of the following formula:

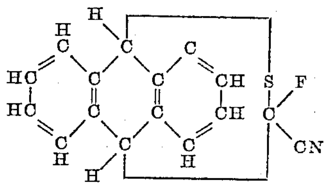

This adduct of fluorothioformyl cyanide and anthracene is pyrolyzed back to the starting materials by heating under reduced pressures, e.g., by heating (by means of a free flame) the adduct in a reaction vessel under a pressure of 0.5–100 mm. Hg.

In addition to the specific compounds illustrated in the examples, the products of this invention include other 3,6-dihydro-2H-1-thiapyrans of the general formula defined previously. Other specific products of this invention and the reactants from which they are made are listed in the following table:

*Table I*

| Reactants | | Product |
|---|---|---|
| 1,3-diene | α-Fluorothiocarbonyl compound | |
| 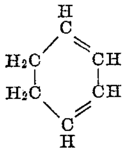 | 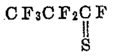 | 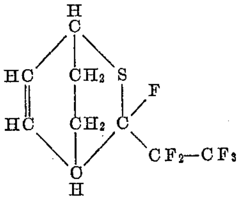 |
| 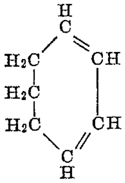 |  | 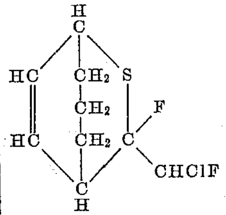 |
| 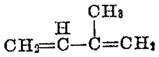 | 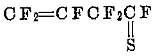 | 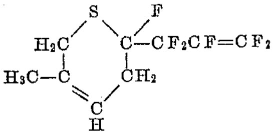<br>(and 4—$CH_3$ isomer) |
| 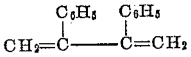 | 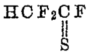 | 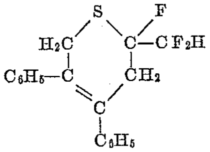 |
| $CH_3CH{=}CH{-}CH{=}CH_2$ | 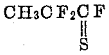 | 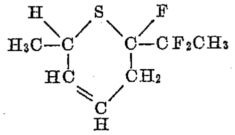<br>(or 3—$CH_3$ isomer) |
| $CH_3(CH_2)_3CH{=}CH{-}CH{=}CH_2$ | 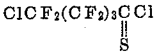 | 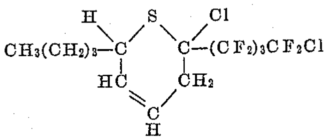<br>(or 3—$C_4H_9$ isomer) |
| $CH_3CH_2CH{=}CH{-}CH{=}CHCH_2CH_3$ |  | 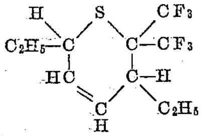 |
| 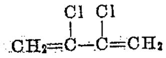 | 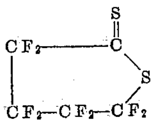 | 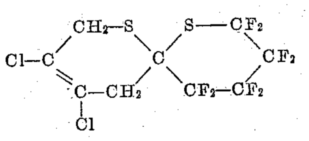 |
| 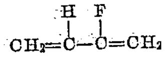 | 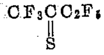 | 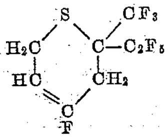 |

*Table 1*—Continued

| Reactants | | Product |
|---|---|---|
| 1,3-diene | α-Fluorothiocarbonyl compound | |
| 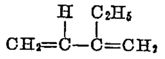 | 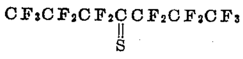 | (and 5—F isomer) 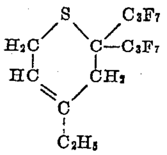 |
| 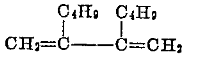 | 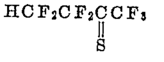 | (or 5—$C_2H_5$ isomer) 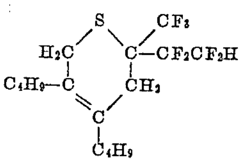 |
| 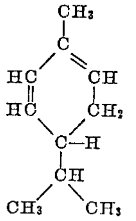 | 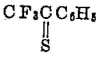 | 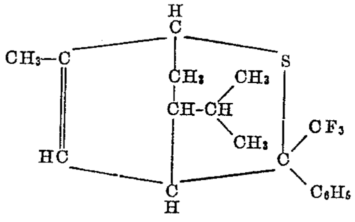 |
| 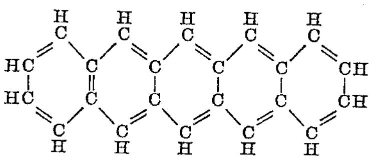 | 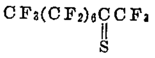 | 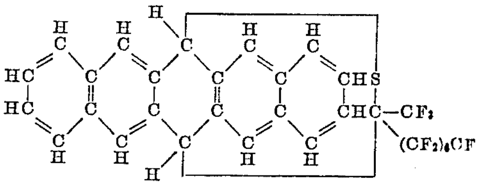 |
| $CH_2=CH-CH=CH_2$ | 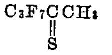 | 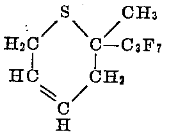 |
| 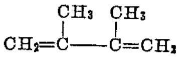 | 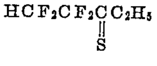 | 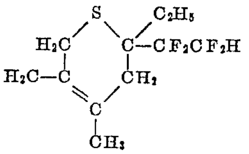 |
| 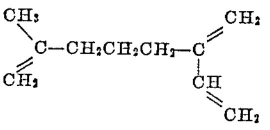 | 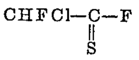 | 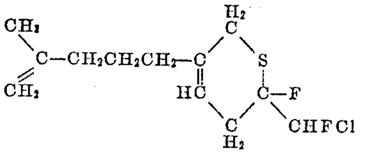 |

The conjugated dienes used in the process of this invention are commonly available or can be made by known methods. The fluorine-containing thiocarbonyl compounds used in the reaction with the conjugated dienes can be prepared by various methods applicable to the various types of fluorothiocarbonyl compounds as described below.

The α-fluorothioacyl fluorides can be prepared by dehydrofluorination, by means of sodium fluoride, of the mercaptans formed from the addition of hydrogen sulfide to polyfluoroolefins (i.e., fluoroolefins having more than one fluorine atom). This dehydrofluorination is conveniently carried out at ordinary temperature and reduced pressure. The α-fluorothioacyl fluorides can also be prepared by sodium fluoride dehydrofluorination of the mercaptans made by reaction of polyfluoroalkyl disulfides (i.e., fluoroalkyl disulfides having more than one fluorine atom) with mercaptans such as thiophenol or octafluoropentanethiol or irradiation with ultraviolet light (Middleton, U.S. application Ser. No. 791,859, filed February 9, 1959).

Thiocarbonyl fluoride and thiocarbonyl chlorofluoride can be prepared by pyrolysis of tetrafluoro-1,3-dithietane and monochlorotrifluoro-1,3-dithietane, respectively, at temperatures of 400–900° C. (Middleton, U.S. application Ser. No. 665,142, filed June 12, 1957, now U.S. Patent 2,980,695). These fluoro-1,3-dithietanes can be prepared by fluorinating tetrachloro-1,3-dithietane with antimony trifluoride in tetramethylene sulfone at a temperature of 90–200° C.

The α-fluorothioacyl chlorides used in the process of this invention can be prepared by various methods, some of which are described below. A general method for preparing the fluorothioacyl chlorides comprises contacting a fluorochloroalkane of the formula $XR_fCY_2Cl$, wherein X is fluorine, chlorine, or hydrogen, Y is chlorine, bromine, or iodine, and $R_f$ is perfluoroalkylene, preferably perfluoroalkylene having 1–10 carbon atoms, with sulfur at temperatures at which the sulfur is in vapor form. At atmospheric pressure, the reaction temperature is about 445° C. At higher or lower reaction pressures, the reaction temperatures are raised or lowered accordingly.

Some fluorothioacyl chlorides can be prepared by contacting a chlorofluoroalkyl mercury compound of the formula $(CF_3CClZ)_2Hg$, wherein Z is bromine or chlorine, with hot liquid or vapor of sulfur. In this reaction, the chlorofluoroalkyl mercury compound is preferably introduced gradually into an excess of refluxing sulfur (at a temperature of 445° C.) under a blanket of an inert gas, e.g., nitrogen, and the volatile fluorothioacyl chloride that is formed is collected in a receiver cooled to a temperature below the boiling point of the fluorothioacyl chloride (Middleton, Serial No. 833,913, filed August 17, 1959).

The fluoroalkyl mercury compounds used in the process described in the preceding paragraph can be prepared by reaction of fluoroolefins of the formula of $ZCCl{=}CF_2$, wherein Z is bromine or chlorine, with mercuric fluoride at elevated temperatures, e.g., 100° C., by the process described in greater detail in U.S. Patent 2,844,614 to C. G. Krespan.

Still another method for preparing fluorothioacyl chlorides comprises the thermal decomposition of chlorinated fluoroalkyl-1,3-dithietanes as illustrated by the following equation:

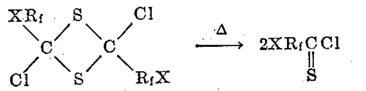

wherein X is fluorine, chlorine or hydrogen and $R_f$ is perfluoroalkylene. This decomposition is generally effected at temperatures between 450 and 700° C. and preferably at reduced pressure (Middleton, Serial No. 833,913).

The acyclic esters of fluorodithiocarboxylic acids used as starting materials in the process of this invention can be prepared by reaction of a thiol of the formula RSH, where R is alkyl or haloalkyl, and an alkali metal fluoride with a compound of the formula $R_fCF_2SH$ or $R_fCSF$, where $R_f$ is a haloalkyl radical having fluorine on the α-carbon. In this reaction, an amount of alkali metal fluoride is used that is equivalent to the amount of hydrogen fluoride being removed from the reactants, i.e., 2 moles of alkali metal fluoride per mole of fluorinated thiol or 1 mole of alkali metal fluoride per mole of fluorothioacyl fluoride. Preferably up to a 10-fold excess of alkali metal fluoride is issued. One mole of the thiol RSH is required for each mole of the fluorinated thiol or fluorinated thioacyl flouride employed. However, an excess of the thiol RSH is generally used, the excess thiol serving as a solvent or reaction medium. The reaction takes place to some extent at least at temperatures of −25° C. or even lower. However, the reaction proceeds faster at temperatures above 0° C. and a temperature of between 15 and 75° C. is preferred (Middleton, Serial No. 836,603, filed August 28, 1959).

The cyclic esters of fluorodithiocarboxylic acids used in the process of this invention can also be prepared by various methods. One method involves the pyrolysis of fluorodispirotrithiahydrocarbons, e.g., perfluorodispiro [3.1.3.2]-5,10,11-trithiaundecane, at temperatures of 450–800° C. at reduced pressures. The pyrolysis products are collected in receivers cooled to low temperatures, e.g., the temperature of a mixture of solid carbon dioxide and acetone, and the cyclic esters of fluorodithiocarboxylic acids that are formed are isolated by fractional distillation.

The fluorodispirotrithiahydrocarbon starting materials for the process described in the preceding paragraph can be prepared by treatment of a fluorocycloalkanone with phosphorus pentasulfide at temperatures of about 210° C. for several hours followed by fractional distillation to isolate the desired dispirotrithiahydrocarbon.

Another method for the preparation of the cyclic esters of fluorodithiocarboxylic acids used in the process of this invention involves the reaction of an α,ω-diiodofluoroalkane with hot liquid or vapor of a phosphorus polysulfide, e.g., $P_2S_5$ or $P_4S_3$. In this process, the diiodofluoroalkane is preferably introduced in vapor form into the refluxing phosphorus polysulfide and the volatile fluorodithiocarboxylic acid ester which is formed is collected in a receiver cooled below the boiling point of the product (Middleton, Serial 836,601).

The α-fluorothioketones used in the process of this invention can be prepared by various methods. One method involves reacting a secondary polyfluoroalkyl iodide (i.e., of at least 3 carbon atoms) with hot liquid or vapor of a phosphorus polysulfide. In this process, the polyfluoroalkyl iodide is preferably introduced in vapor form into refluxing phosphorus polysulfide and the volatile polyfluorothioketone which is formed is collected in a receiver cooled below the boiling point of the polyfluorothioketone, e.g., in a trap cooled by a mixture of solid carbon dioxide and acetone. The secondary polyfluoroalkyl iodides used in this process can be made by known methods. For example, they can be made by the free radical addition of the appropriate fluoroalkyl iodide to a fluoroolefin. This and other methods for preparing fluoroalkyl iodides are described in "Aliphatic Fluorine Compounds" by Lovelace, Rausch and Postelnek, Reinhold Publishing Corporation, New York (1958), pp. 37–40. (Howard & Middleton, U.S. application Ser. No. 791,857, filed February 9, 1959.)

Another method for preparing polyfluorothioketones consists in heating a polyfluoroketone with phosphorus pentasulfide for several hours at elevated temperatures, e.g., 200–300° C. under autogenous pressure. The polyfluoroketones used as starting materials in this method can be prepared by known methods, e.g., those described on p. 183 of "Aliphatic Fluorine Compounds," referred to above (Howard & Middleton, *loc. cit.*).

Partially fluorinated thioketones of the type illustrated by 1,1,1-trifluorothioacetone can be made by thermal decomposition at temperatures ranging from 150° to 750° C. of the corresponding gem.-dithiols or ol-thiols which are in turn obtained by treatment of the corresponding fluorinated ketones with hydrogen sulfide in the presence or absence of phosphorus pentoxide (Kealy CR 5367, filed herewith).

The 3,6-dihydro-2H-1-thiapyrans of this invention are useful in a variety of applications. They are particularly useful as a means for storing α-fluorothiocarbonyl compounds which are relatively unstable since they can be pyrolyzed back to the starting materials when they are needed. The adducts of anthracene and fluorothiocarbonyl compounds arep articularly useful in this respect.

The products of this invention are also useful as fumigants. Thus, the 3,6-dihydro-2H-1-thiapyrans can be heated to decompose the adduct into their starting dienes and α-fluorothiocarbonyl compounds. The α-florothiocarbonyl compounds, particularly the fluorothioacyl fluorides and chlorides, are especially effective fumigants and insecticides against ordinary houseflies. Consequently, the products of this invention are particularly useful for generating the effective insecticide and fumigant in the location to be treated.

The products of this invention are also useful as plasticizers and softeners for polymeric materials such as polythiocarbonyl fluoride.

The 3,6-dihydro-2H-1-thiapyrans can also be polymerized by addition polymerization to polymers that are useful as adhesives, coating compositions, plastics and elastomers.

Since obvious modifications and equivalents in the invention will be evident to those skilled in the chemical arts, I propose to be bound solely by the appended claims.

The embodiments of the invention is which an exclusive property or privilege is claimed are defined as follows:

1. 2,2-bis-trifluoromethyl-3,6-dihydro-2H-1-thiapyran.

2. 2,2-bis-trifluoromethyl - 3,6-dihydro - 4,5-dimethyl-2H-1-thiapyran.

3. A 2,2-bis-trifluoromethyl-chloro-3,6-dihydro-2H-1-thiapyran.

4. 3,3-bis-trifluoromethyl-2-thiabicyclo[2.2.1]hept - 5-ene.

5. 12,12-bis-trifluoromethyl-9,10-dihydro-9,10 - epithiomethanoanthracene.

6. 2,3,4-hexafluoro-8,9-dimethyl - 1,6 - dithiaspiro[4.5] dec-8-ene.

7. 2,2-bis-trifluoromethyl-3,6-epoxy-3,6 - dihydro - 2H-1-thiapyran.

8. 3,7,8,8a-tetrahydro - 2,2,7,7 - tetrakis(trifluoromethyl)-5,8-etheno-2H,5H-thiapyrano[4,3-b]thiapyran.

9. 12-cyano-12-fluoro-9,10-dihydro - 9,10-epithiomethanoanthracene.

10. A 2,2-bis-fluoroalkyl-3,6-dihydro-2H - 1-thiapyran in which the alkyl group contains up to 7 carbon atoms.

11. 3,3-difluoro-2-thiabicyclo[2.2.1]hept-5-ene.

12. 3-chlorodifluoromethyl-3-ethylthio - 2 - thiabicyclo [2.2.1]hept-5-ene.

13. 3,7,8,8a-tetrahydro-2,2,7,7-tetrakis - (trifluoromethyl)-5,8-etheno-4-phenyl - 2H,5H - thiapyrano[4,3-b]thiapyran.

14. 2-fluoro-2-trifluoromethyl - 3,6-dihydro-4,5-dimethyl-2H-1-thiapyran.

15. 2-fluoro-2-trifluoromethyl - 3,6-dihydro-2H-1-thiapyran.

16. 2-trifluoromethyl-2-ethylthio - 3,6 - dihydro-4,5-dimethyl-2H-1-thiapyran.

17. 2-trifluoromethyl-3,6-dihydro-2,4,5 - trimethyl-2H-1-thiapyran.

18. 2-ethyl-2-(1,1,2,2-tetrafluoroethyl) - 3,6 - dihydro-4,5-dimethyl-2H-1-dithiapyran.

19. 2-trifluoromethyl-3,6-dihydro - 4,5 - dimethyl-2-phenyl-2H-1-thiapyran.

20. A process for preparing the compounds of claim 21 which comprises contacting, at reaction temperature, a compound of the formula:

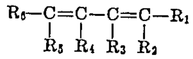

with a compound of the formula:

wherein X, Y and the R's are defined as in claim 21.

21. A compound of the formula

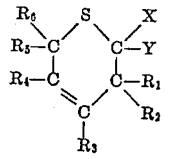

wherein X is selected from the group consisting of (1) monovalent fluorine and α-fluoroalkyl and α-fluoroalkylthio of up to 7 carbons and (2) divalent α-fluoroalkylenethio of up to 7 carbons the free valence of which is joined to divalent Y; Y is selected from the group consisting of (1) monovalent fluorine, chlorine, and aryl hydrocarbon, alkyl alkylthio, α-fluoroalkyl and α-fluoroalkylthio of up to 7 carbons and (2) divalent α-fluoroalkylenethio and α-fluoroalkylene of up to 7 carbons the free valence of which is joined to divalent X; $R_1$ and $R_5$ are selected from the group consisting of hydrogen and monovalent hydrocarbon of up to 8 carbons free of nonaromatic unsaturation; $R_2$ and $R_6$ are selected from the group consisting (1) separately, of monovalent hydrogen and hydrocarbon of up to 8 carbons free of nonaromatic unsaturation and (2), jointly, of divalent hydrocarbon of up to 10 carbons free of nonaromatic unsaturation; and $R_3$ and $R_4$ are selected from the group consisting (1), separately, of monovalent hydrogen, fluorine, chlorine and hydrocarbon of up to 8 carbons free of nonaromatic unsaturation and (2), jointly, of divalent hydrocarbon of up to 10 carbons free of nonaromatic unsaturation.

No references cited.